Patented Mar. 7, 1939

2,149,843

UNITED STATES PATENT OFFICE 2,149,843

TREATMENT OF CHEMICAL PULP

Frederick F. Frick, Anaconda, Mont., assignor to International Smelting and Refining Company, East Chicago, Ind., a corporation of Montana No Drawing. Application April 4, 1936,
Serial No. 72,770

7 Claims. (Cl. 210—1)

This invention relates to the separation of solid matter from liquids by decantation, sedimentation, settlement, or the like, and has for an object the provision of an improved method of increasing the rate of settlement of solid matter from a chemical or metallurgical pulp. The invention constitutes an improvement of the process described and claimed in my copending application Serial No. 43,197, filed October 2, 1935, of which the present application is a continuation in part.

In any process involving the separation of solids from a liquid by decantation, sedimentation, settlement, or the like, a mixture comprising a solid and liquid phase is introduced into a suitable container and is allowed to remain therein for a sufficient period of time to permit the relatively heavy solid particles to settle to the lower portion of the container. The supernatant liquid is then withdrawn from the upper portion of the container. The operation may be conducted in a continuous manner by continuously introducing the suspension into the container and continuously and separately withdrawing the suspended matter and the supernatant liquid, or batches of the liquid-solid mixture may be treated individually. In either case the speed and efficiency with which the separation is effected depend upon the rate at which the solid particles settle in the liquid medium in which they are suspended. Any method which will increase the rate at which settlement occurs will in general improve both the speed and efficiency of the separation.

The present invention provides an improved method for increasing the rate of settlement of suspended matter in chemical or metallurgical pulps and thereby increasing the speed and efficiency of decantation and similar operations. The term "pulp" as employed herein refers to a mixture of solid and liquid matter. The solid component of the pulp may comprise one or more substances and may range in particle size from extremely fine to rather coarse. The liquid component, generally aqueous, may consist of a relatively pure liquid, or it may comprise a solution of two or more liquids or a solution of a normally solid substance in a liquid, for example, an aqueous salt solution.

In my aforementioned application, I have described and claimed a method of increasing the rate of settlement of suspended matter in pulp which comprises preparing a cooked aqueous emulsion of starch-bearing material such as flour, and incorporating the cooked emulsion in the pulp. I have now discovered that the effectiveness of the cooked emulsion can be much improved by incorporating therein an alkaline reagent. I prefer to employ a caustic alkali metal compound such as caustic soda and to incorporate it in the emulsion by adding it to the starch-bearing material during the cooking operation. When an alkaline agent such as caustic soda is used, the resulting product is clearer, thinner and more uniform, and it is considerably more effective as a coagulant than the cooked starch-bearing material alone.

In carrying out a preferred method of the invention, an emulsion comprising a starch-bearing material and caustic soda is prepared and incorporated in the pulp prior to carrying out the separation of the solid and liquid components thereof. Apparently, the starch, upon being incorporated in the pulp, causes the particles of solid matter to coagulate or coalesce into relatively coarse particles, thereby materially increasing the mass of each particle and thus increasing the rate at which they will settle in the liquid. The manner in which the caustic soda functions is not understood. Conceivably, it has a beneficial chemical effect on the starch, but more probably its action is mainly physical in nature. Caustic soda is sometimes employed as a dispersing agent for colloidal sols, and it is thought that when incorporated in the emulsion, the caustic soda serves to disperse the colloidal starch particles and thereby form a more uniform emulsion.

Any suitable starch-bearing material may be employed in preparing the emulsion. Starch itself may be used, or starch-bearing grains or vegetables may in some cases prove effective. Grain flour, however, has been found to be a particularly satisfactory starch-bearing material, and its use generally is preferred. Particular reference will therefore be made to starch-bearing emulsions prepared from flour. For purposes of economy in practicing the invention, relatively low-grade flour products such, for example, as foundry flour may be employed advantageously.

High-grade caustic soda (sodium hydroxide), although it may be used, is not necessary in preparing the emulsion; ordinary commercial caustic soda will serve very well. In general, a "cooked" aqueous emulsion is preferred in carrying out the method of the invention. Such an emulsion may be prepared by mixing the starch-bearing material, for example, flour, and water in suitable proportions, say one pound of flour to ten gallons of water, and heating (cooking) the mixture, preferably at the boiling point for about five to ten minutes. The heating may be accomplished by heating the container in which the water-flour mixture is prepared, or live steam may be introduced directly into the mixture. Caustic soda is added to the flour-water mixture during the cooking operation in an amount corresponding to one part by weight of caustic soda to about five to twenty parts by weight of flour; in other words, for each pound of flour in the mixture, about 0.2 to about 0.05 pound of caustic soda is added. The resulting cooked emulsion is added to the pulp prior to decantation or other similar operation and preferably is incorporated therein by agitation.

As a specific example of the method of the present invention, its use in conjunction with the process described and claimed in the copending application of Frederick F. Frick and Jehu P. Cooper, Serial Number 751,448, filed November 5, 1934, is described below. In the process of that application, slime products containing tin, lead, antimony, and the like, obtained during the processing of secondary metals for the recovery of their metal values, are treated for separation of their lead content, which is in the form of lead sulphate. The slime is first treated with a water solution of an alkali metal carbonate, which converts the lead to lead carbonate. The insoluble lead carbonate, together with insoluble tin-bearing material, is separated from the resulting alkali metal sulphate solution by decantation, and the residue is washed by repeated agitation with water, followed by further decantation.

The washed residue of lead carbonate and tin-bearing material is treated with nitric acid to dissolve the lead carbonate, leaving the tin compounds substantially unaffected. Separation of the tin, which may be in the form of tin oxide or tin hydrate, from the lead nitrate solution is effected by decantation; it is then washed repeatedly with water and the washings are again decanted.

Each of the decantation operations involved in the above process may be carried out more quickly and more efficiently by proceeding in accordance with the present invention. In each case, an aqueous emulsion containing a starch-bearing material, for example, flour, and caustic soda is prepared as described above and is added to the pulp. The pulp is agitated to thoroughly incorporate the emulsion therein, and it is then allowed to settle, after which the supernatant liquid is decanted. Settlement of the solid matter, whether it be the lead carbonate or the tin oxide, proceeds rapidly and effectively, so that a quick and efficient separation of the solids from the bulk of the liquid is readily achieved.

Only a very small quantity of the emulsion need be employed in proceeding according to the invention. For example, in separating lead carbonate or tin oxide from aqueous suspension in accordance with the above example, only that amount of emulsion corresponding to about four pounds of flour per twenty-five tons of pulp being treated was required to accomplish quick and thorough settlement of the solid matter. In the treatment of pulps containing other solids than those of the example, more or less than this amount of the emulsion may be required to secure the best results.

I claim:

1. In decanting a chemical or metallurgical pulp, the improvement which comprises preparing a cooked aqueous emulsion by heating substantially to the boiling point a mixture of water, starch-bearing material and caustic soda, and incorporating the resulting cooked emulsion in the pulp, thereby to increase the rate of settlement of suspended matter in the pulp.

2. The method of increasing the rate of settlement of suspended matter in a chemical or metallurgical pulp which comprises preparing a cooked emulsion by heating a mixture of flour and water substantially to the boiling point, adding caustic soda to the mixture in an amount corresponding to one part of caustic soda to about 5 to 20 parts of flour, and incorporating the resulting cooked emulsion in the pulp.

3. The method of increasing the rate of settlement of suspended matter in a chemical or metallurgical pulp which comprises preparing a cooked emulsion comprising a starch-bearing material and an alkaline reagent by heating a mixture of the starch-bearing material, the alkaline reagent and water to a temperature sufficiently high to effect emulsification of the starch-bearing material, and incorporating the resulting cooked emulsion in the pulp.

4. The method of increasing the rate of settlement of suspended matter in a chemical or metallurgical pulp which comprises preparing a cooked emulsion comprising a starch-bearing material and an alkali metal compound by heating a mixture of the starch-bearing material, the alkali metal compound, and water substantially to the boiling point, and incorporating the resulting cooked emulsion in the pulp.

5. The method of increasing the rate of settlement of lead carbonate from an aqueous pulp containing lead carbonate in suspension which comprises preparing a cooked aqueous emulsion by heating a mixture of flour, caustic soda and water substantially to the boiling point, adding the thus prepared emulsion to the pulp, and agitating the pulp to incorporate the emulsion therein.

6. In the processing of secondary metals involving the production of an aqueous pulp containing a suspended tin compound and decantation of said pulp, the improvement which comprises preparing a cooked aqueous emulsion by heating a mixture of flour, caustic soda and water substantially to the boiling point, and incorporating the thus prepared emulsion in the pulp prior to decantation thereof, thereby to increase the rate of settlement of the tin compound.

7. The method of increasing the rate of settlement of suspended matter in a chemical or metallurgical pulp which comprises preparing a cooking emulsion comprising a starch-bearing material and an alkaline reagent by heating a mixture of the starch-bearing material, the alkaline regent and water substantially to the boiling point, and incorporating the resulting cooked emulsion in the pulp.

FREDERICK F. FRICK.